(12) United States Patent
Araki et al.

(10) Patent No.: US 12,204,560 B2
(45) Date of Patent: Jan. 21, 2025

(54) CLASSIFICATION DEVICE AND CLASSIFICATION METHOD

(71) Applicant: NIPPON TELEGRAPH AND TELEPHONE CORPORATION, Tokyo (JP)

(72) Inventors: Shohei Araki, Tokyo (JP); Bo Hu, Tokyo (JP); Kazunori Kamiya, Tokyo (JP); Masaki Tanikawa, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 206 days.

(21) Appl. No.: 16/975,687

(22) PCT Filed: Feb. 22, 2019

(86) PCT No.: PCT/JP2019/006881
§ 371 (c)(1),
(2) Date: Aug. 25, 2020

(87) PCT Pub. No.: WO2019/167847
PCT Pub. Date: Sep. 6, 2019

(65) Prior Publication Data
US 2020/0401608 A1  Dec. 24, 2020

(30) Foreign Application Priority Data
Feb. 27, 2018 (JP) ................................ 2018-033888

(51) Int. Cl.
*G06F 16/00* (2019.01)
*G06F 16/26* (2019.01)
*G06F 16/28* (2019.01)
*G06N 20/00* (2019.01)
(Continued)

(52) U.S. Cl.
CPC ............ *G06F 16/285* (2019.01); *G06F 16/26* (2019.01); *G06N 20/00* (2019.01); *H04L 69/324* (2013.01); *H04L 69/326* (2013.01)

(58) Field of Classification Search
CPC ....... G06F 16/285; G06F 16/26; G06N 20/00; G06N 5/025; H04L 69/324; H04L 69/326; H04L 63/1408
See application file for complete search history.

(56) References Cited

U.S. PATENT DOCUMENTS

2002/0082886 A1    6/2002  Manganaris et al.
2011/0252032 A1*  10/2011  Fitzgerald ............... H04L 63/20
                                                        709/224

(Continued)

OTHER PUBLICATIONS

Data Mining Applied to Darknet Traffic Analysis (Year: 2016).*
(Continued)

*Primary Examiner* — Tyler J Torgrimson

(57) ABSTRACT

A classification apparatus 10 acquires a communication log including a plurality of pieces of traffic data, and extracts different types of feature values from the plurality of pieces of traffic data. Subsequently, the classification apparatus 10 classifies the traffic data on a per IP address basis based on the extracted different types of feature values, and uses a plurality of classification results to count the number of times of appearance of a pattern having the same combination of the classification results.

20 Claims, 15 Drawing Sheets

(51) Int. Cl.
  *H04L 69/324* (2022.01)
  *H04L 69/326* (2022.01)

(56) References Cited

U.S. PATENT DOCUMENTS

2012/0254333 A1* 10/2012 Chandramouli ........ G06F 40/10
                                                      709/206
2016/0359705 A1   12/2016 Parandehgheibi et al.
2017/0063896 A1*   3/2017 Muddu ............... G06F 3/04842

OTHER PUBLICATIONS

Multidimensional investigation of source port 0 probing (Year: 2014).*
Large-Scale Monitoring for Cyber Attacks by Using Cluster Information on Darknet Traffic Features (Year: 2015).*
Japanese Patent Application No. 2018-033888, Office Action with Machine translation, Mailed Jun. 1, 2021, 8 pages.
Kengo et al. (2016) "Classification of scanning tools by sequential analysis and scanning characteristic quantity" Proceedings of the 2016 IEICE General Conference, Mar. 15-18, 2016, Kyushu University, Fukuoka, Japan, 6 pages.
Digital Advantage (2004) "TCP Protocol for Realizing fifteenth reliable communication from foundations" [online] website: https://www.atmarkit.co.jp/ait/articles/0401/29/news080_2.html.
Van et al. (2004) "Traffic Analysis Method for DDoS Detection" Forum on Information Technology, Sep. 7-9, 2004, 6 pages.
Perdisci et al. (2006) "Using an Ensemble of One-Class SVM Classifiers to Harden Payload-based Anomaly Detection Systems" Proceedings of the Sixth International Conference on Data Mining (ICDM'06).
International Search Report for Application No. PCT/JP2019/006881, mailed Apr. 23, 2019, 2 pages (English Translation).
Gu, G. et al., "BotMiner: Clustering Analysis of Network Traffic for Protocol- and Structure—Independent Botnet Detection", [online], Proceedings of the 17th USENIX Security Symposium, Jul. 31, 2008, pp. 139-154, [retrieved on Apr. 10, 2019], Retrieved from the Internet: <URL:https://www.usenix.org/legacy/event/sec08/tech/full_papers/gu/gu.pdf> and <URL:https://www.usenix.org/conference/17thusenix-securitysymposium/presentation/botminerclustering-analysis-network-traffic-> and <URL:https://www.usenix.org/legacy/events/sec08/sec081.html>.
Yi, J., "A Novel Research on Real-Time Intrusion Detection Technology Based on Data Mining", [online], Proceedings of the 2015 2nd International Workshop on Materials Engineering and Computer Sciences (IWMECS 2015), Oct. 2015, pp. 881-885, ISBN: 978-94-6252-114-8, ISSN: 2352-538X, <DOI: https://doi.org/10.2991/iwmecs-15.2015.172>, [retrieved on Apr. 10, 2019], Retrieved from the Internet: URL:https://www.atlantispress.com/proceedings/iwmecs-15/25840718.
Ban, T., "Data Mining Applied to Darknet Traffic Analysis", [online], Journal of the National Institute of Information and Communications Technology, vol. 63, No. 2, Mar. 2017, pp. 45-54, ISSN: 2433-6017, [retrieved on Apr. 10, 2019], Retrieved from the Internet: <URL:http://www.nict.go.jp/publication/shuppan/kihou-journal/journalvol63no2/journal-vol63no2-03-03.pdf> and <URL:http://www.nict.go.jp/en/data/journal/index.html> and <URL:http://www.nict.go.jp/publication/shuppan/kihou-journal/journal-vol63no2.html>.

* cited by examiner

Fig. 2

| SOURCE IP ADDRESS | DESTINATION IP ADDRESS | SOURCE PORT NUMBER | DESTINATION PORT NUMBER | PROTOCOL | FLAG | ... |
|---|---|---|---|---|---|---|
| A | B | 51001 | 80 | TCP | SYN | ... |
| A | B | 51002 | 80 | TCP | FIN | ... |
| ... | ... | ... | ... | ... | ... | ... |

Fig. 3

| IP ADDRESS | FEATURE VALUE SET A | FEATURE VALUE SET B | FEATURE VALUE SET C | ... |
|---|---|---|---|---|
| A | 1 | 2 | 1 | ... |
| B | 1 | 2 | 1 | ... |
| C | 2 | 1 | 3 | ... |
| ⋮ | ⋮ | ⋮ | ⋮ | ⋮ |

- USE FLOW OF ADDRESS SATISFYING FOLLOWING TWO CONDITIONS
  - IP ADDRESS FROM WHICH SYN HAS BEEN TRANSMITTED TO DARKNET
  - IP ADDRESS AT WHICH 20 OR MORE ONE-WAY FLOWS HAVE BEEN OBSERVED DURING PREDETERMINED TIME PERIOD

Fig. 9

| SET NAME | FEATURE VALUE | COMPILATION UNIT | NUMBER OF DIMENSIONS |
|---|---|---|---|
| TRANSMISSION FLAG | RATIOS OF TCP FLAG [URG, SYN, PSH, RST, ACK, FIN] | sa | 6 |
| RECEPTION FLAG | | da | 6 |
| TRANSMISSION AMOUNT | {MAXIMUM, MINIMUM, AVERAGE, VARIANCE} OF NUMBER OF BYTES PER PACKET | sa | 4 |
| RECEPTION AMOUNT | | da | 4 |
| TRANSMISSION AMOUNT 2 | {MAXIMUM, MINIMUM, AVERAGE, VARIANCE} OF NUMBER OF BYTES PER PACKET WITH ACK | sa | 4 |
| RECEPTION AMOUNT 2 | | da | 4 |
| SOURCE PORT | {min, 25%, mid, 75%, max} WHEN SOURCE PORT NUMBERS ARE ARRANGED IN ASCENDING ORDER | cli | 5 |
| client PORT | | srv | 5 |
| DESTINATION PORT | {min, 25%, mid, 75%, max} WHEN DESTINATION PORT NUMBERS ARE ARRANGED IN ASCENDING ORDER | cli | 5 |
| server PORT | | srv | 5 |
| OS | OS CLASSIFICATION IN DARKNET | - | 22 |

Fig. 11

- BOT WHICH SEEMS TO BE mirai-BASED BOT

| FEATURE VALUE SET | FREQUENT PATTERN | INTERPRETATION RESULT |
|---|---|---|
| TRANSMISSION FLAG | ○ | LARGE NUMBER OF SYNS |
| TRANSMISSION AMOUNT | ○ | SMALL |
| TRANSMISSION AMOUNT 2 | ○ | SMALL |
| RECEPTION FLAG | × | – |
| RECEPTION AMOUNT | ○ | SMALL |
| RECEPTION AMOUNT 2 | ○ | SMALL |
| SOURCE PORT | × | – |
| DESTINATION PORT | ○ | 23 AND 2323 ARE USED |
| client PORT | × | – |
| server PORT | × | – |
| OS | ○ | Linux 2.4.x |

Fig. 12

- SCANNER WHICH USES FIXED SOURCE PORT NUMBER

| FEATURE VALUE SET | FREQUENT PATTERN | INTERPRETATION RESULT |
|---|---|---|
| TRANSMISSION FLAG | × | — |
| TRANSMISSION AMOUNT | ○ | SMALL, DATA IS RARELY TRANSMITTED |
| TRANSMISSION AMOUNT 2 | ○ | SMALL, DATA IS RARELY TRANSMITTED |
| RECEPTION FLAG | × | — |
| RECEPTION AMOUNT | ○ | LARGE |
| RECEPTION AMOUNT 2 | ○ | LARGE |
| SOURCE PORT | ○ | FEATURE IS PRESENT |
| DESTINATION PORT | × | — |
| client PORT | ○ | FEATURE IS PRESENT |
| server PORT | × | — |
| OS | ○ | Windows 7or8 |

DESTINATION PORT HAS NO FEATURE
= ARE VARIOUS PORTS SCANNED?

CLASSIFICATION DEVICE AND CLASSIFICATION METHOD

CROSS-REFERENCE TO RELATED APPLICATIONS

This application is a U.S. 371 Application of International Patent Application No. PCT/JP2019/006881, filed on 22 Feb. 2019, which application claims priority to and the benefit of JP Application No. 2018-033888, filed on 27 Feb. 2018, the disclosures of which are hereby incorporated herein by reference in their entireties.

TECHNICAL FIELD

The present invention relates to a classification apparatus and a classification method.

BACKGROUND ART

There is a conventionally known technique for extracting multidimensional feature values from a plurality of pieces of data, classifying the individual pieces of data by using the extracted feature values, and analyzing the classification result. For example, as countermeasures against attacks which use a botnet constituted by infected terminals, multidimensional feature values are extracted from a plurality of pieces of traffic data included in a communication log, clustering of IP addresses is performed by using the extracted feature values, and the result of the clustering is analyzed.

CITATION LIST

Non Patent Literature

[NPL 1] Guofei Gu, Roberto Perdisci, Junjie Zhang, and Wenke Lee, "BotMiner: Clustering Analysis of Network Traffic for Protocol- and Structure-Independent Botnet Detection", 17th USENIX Security Symposium p 139-p 154, USENIX Association, 2008

SUMMARY OF THE INVENTION

Technical Problem

However, the conventional art has a problem where it is not easy to grasp features of data from the classification result. For example, in a method in which clustering of the IP addresses is performed by using the multidimensional feature values from the traffic data included in the communication log, there are cases where, as the number of dimensions of the extracted feature value increases, it is not possible to easily grasp the feature on which attention is focused when a cluster is formed. In addition, when the number of dimensions of the extracted feature value is large, there are cases where clustering is not performed appropriately.

The present invention has been made in view of the above problem, and an object thereof is to facilitate grasping of features of data from a classification result.

Means for Solving the Problem

In order to solve the above problem and achieve the object, a classification apparatus of the present invention is a classification apparatus including: an acquisition section which acquires a plurality of pieces of data; an extraction section which extracts different types of feature values from the plurality of pieces of data acquired by the acquisition section; a classification section which classifies the data with a predetermined unit based on the different types of feature values extracted by the extraction section; and a counting section which uses a plurality of classification results obtained by the classification by the classification section to count the number of times of appearance of a pattern having the same combination of the classification results.

In addition, a classification method of the present invention is a classification method executed by a classification apparatus, the classification method including: an acquisition step of acquiring a plurality of pieces of data; an extraction step of extracting different types of feature values from the plurality of pieces of data acquired by the acquisition step; a classification step of classifying the data with a predetermined unit based on the different types of feature values extracted by the extraction step; and a counting step of using a plurality of classification results obtained by the classification by the classification step to count the number of times of appearance of a pattern having the same combination of the classification results.

Effects of the Invention

According to the present invention, the effect of facilitating grasping of features of data from the classification result is achieved.

BRIEF DESCRIPTION OF DRAWINGS

FIG. 2 is a view showing an example of information stored in a communication log storage section.

FIG. 3 is a view showing an example of information stored in a classification result storage section.

FIG. 9 is a view showing a specific example of a feature value set.

FIG. 11 is a view showing an example of an observed bot having features.

FIG. 12 is a view showing an example of an observed bot having features.

DESCRIPTION OF EMBODIMENTS

Hereinbelow, an embodiment of a classification apparatus and a classification method according to the present application will be described in detail based on the drawings. Note that the classification apparatus and the classification method according to the present application are not limited by the embodiment. For example, a description will be made by using, as an example, communication data as target data to be analyzed in the following embodiment, but the target data to be analyzed is not limited thereto, and any data may be used as the target data to be analyzed.

First Embodiment

In the following embodiment, the configuration of a classification apparatus according to a first embodiment and the flow of processes in the classification apparatus will be described in this order, and an effect obtained by the first embodiment will be described lastly.
[Configuration of Classification Apparatus]

Figure 1:
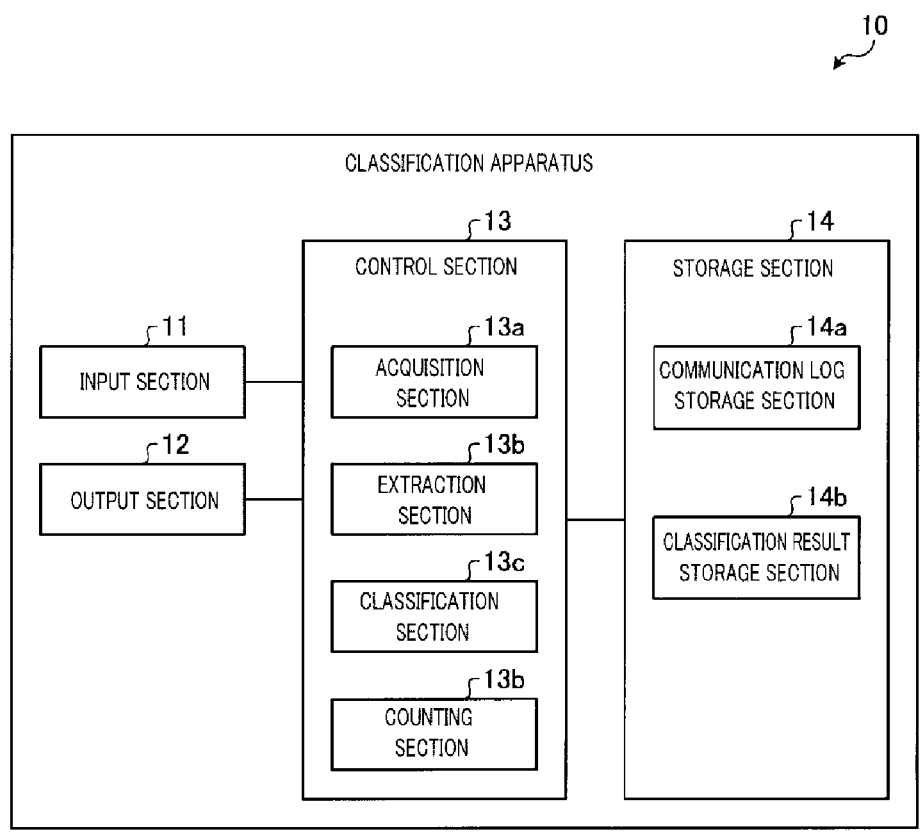
FIG. 1 is a block diagram showing an example of the configuration of a classification apparatus according to a first embodiment.

First, by using FIG. 1, a description will be given of the configuration of a classification apparatus 10. FIG. 1 is a block diagram showing an example of the configuration of the classification apparatus according to the first embodiment. As shown in FIG. 1, the classification apparatus 10 has an input section 11, an output section 12, a control section 13, and a storage section 14. Hereinafter, a description will be given of processes of individual sections of the classification apparatus 10.

The input section 11 is implemented by using an input device such as a keyboard or a mouse, and inputs various pieces of instruction information into the control section 13 in response to an input operation by an operator. The output section 12 is implemented by a display apparatus such as a liquid crystal display, a printing apparatus such as a printer, an information communication apparatus, or a speaker, and outputs, e.g., a frequent pattern described later and the like to the operator.

The storage section 14 stores data and programs required for various processes by the control section 13, and has a communication log storage section 14a and a classification result storage section 14b which are particularly closely related to the present invention. An example of the storage section 14 includes a semiconductor memory device such as a RAM (Random Access Memory) or a flash memory, or a storage device such as a hard disk or an optical disk.

The communication log storage section 14a stores a communication log acquired by an acquisition section 13a described later. For example, as the communication log, communication logs having various forms such as an xFlow, a Proxy log, and a Firewall log are used. Note that, in the following example, a description will be made by mainly using the xFlow serving as flow information of a network as an example. The xFlow includes a source IP address, a destination IP address, a source port number, a destination port number, a protocol, and a flag.

Herein, by using FIG. 2, a description will be given of an example of information stored in the communication log storage section 14a. FIG. 2 is a view showing an example of information stored in the communication log storage section. As shown by way of example in FIG. 2, the communication log storage section 14a stores "source IP address" indicative of an IP address of a source, "destination IP address" indicative of an IP address of a destination, "source port number" indicative of a port number of a source, "destination port number" indicative of a port number of a destination, "protocol" indicative of a communication protocol, and "flag" indicative of a control flag in a TCP header.

The classification result storage section 14b stores a classification result obtained by classification by a classification section 13c described later. For example, as shown by way of example in FIG. 3, the classification result storage section 14b stores labels of the classification results of a feature value set A, a feature value set B, a feature value set C . . . for each IP address. Herein, the feature value set denotes a combination of preset feature values to be extracted. FIG. 3 is a view showing an example of information stored in the classification result storage section.

A description will be made by using the example in FIG. 3. The classification result storage section 14b stores the label "1" of the feature value set A, the label "2" of the feature value set B, and the label "1" of the feature value set C for an IP address "A". In addition, the classification result storage section 14b stores the label "1" of the feature value set A, the label "2" of the feature value set B, and the label "1" of the feature value set C for an IP address "B". Further, the classification result storage section 14b stores the label "2" of the feature value set A, the label "1" of the feature value set B, and the label "3" of the feature value set C for an IP address "C".

The control section 13 has an internal memory for storing programs and required data in which procedures of various processes are specified and executes the various processes by using the programs and the required data and, the control section 13 has the acquisition section 13a, an extraction section 13b, the classification section 13c, and a counting section 13d which are particularly closely related to the present invention. Herein, the control section 13 is an electronic circuit such as a CPU (Central Processing Unit) or an MPU (Micro Processing Unit), or an integrated circuit such as an ASIC (Application Specific Integrated Circuit) or an FPGA (Field Programmable Gate Array).

The acquisition section 13a acquires a communication log including a plurality of pieces of traffic data. Specifically, when the acquisition section 13a acquires the communication log including the plurality of pieces of traffic data in a predetermined time period, the acquisition section 13a stores the traffic data included in the acquired communication log in the communication log storage section 14a. Note that the acquisition section 13a may acquire the communication log in real time, or may also perform a batch process for segmenting the plurality of pieces of traffic data into traffic data groups in a predetermined time period and store the traffic data groups in the communication log storage section 14a.

In addition, as preprocessing performed on the acquired communication log, the acquisition section 13a may store only traffic data having the IP address which satisfies a predetermined condition in the communication log storage section 14a as a target to be processed. For example, the acquisition section 13a may store, in the communication log storage section 14a, only the traffic data having, as a source, an IP address which satisfies a predetermined condition (1) that a packet in which a control flag in a TCP header indicates "SYN" has been transmitted to a darknet from the IP address, and a predetermined condition (2) that 20 or more flows in one-way communication have been observed during a predetermined time period at the IP address. In addition, even in the case where one of the predetermined conditions (1) and (2) described above is satisfied, the acquisition section 13a may store the traffic data having the corresponding IP address as the source in the communication log storage section 14a.

The extraction section 13b extracts different types of feature values from a plurality of pieces of traffic data acquired by the acquisition section 13a. Specifically, the extraction section 13b extracts the feature values specified by each preset feature value set.

For example, from among feature values related to the number of bytes sent of traffic data, the number of bytes received of traffic data, a transmission flag of traffic data, a reception flag of traffic data, a destination port number of traffic data, and a source port number of traffic data, the extraction section 13b extracts two or more types of the feature values as the different types of feature values.

The classification section 13c classifies the traffic data on a per IP address basis based on the different types of feature values extracted by the extraction section 13b. Specifically, the classification section 13c performs clustering of the individual IP addresses based on a combination of the feature values extracted for each feature value set, assigns a label to each IP address based on the clustering result, and stores the IP address in the classification result storage section 14b. In addition, the classification section 13c may classify the traffic data on a per IP address basis by using, e.g., an unsupervised machine learning method.

The counting section 13d uses a plurality of classification results obtained by the classification by the classification section 13c to count the number of times of appearance of a pattern having the same combination of the classification results. In addition, the counting section 13d counts the number of times of appearance of the pattern having the same combination of the classification results, and outputs a pattern which satisfies a predetermined condition. Specifically, the counting section 13d uses a plurality of the classification results obtained by the classification by the classification section 13c to count the number of times of appearance of the pattern having the same combination of the classification results and, in the case where the number of times of appearance of the pattern having the same combination of the classification results is equal to or greater than a threshold value, the counting section 13d outputs the pattern via the output section 12. For example, the counting section 13d may count the number of times of appearance of the pattern by using a frequent pattern mining method.

Figure 4:
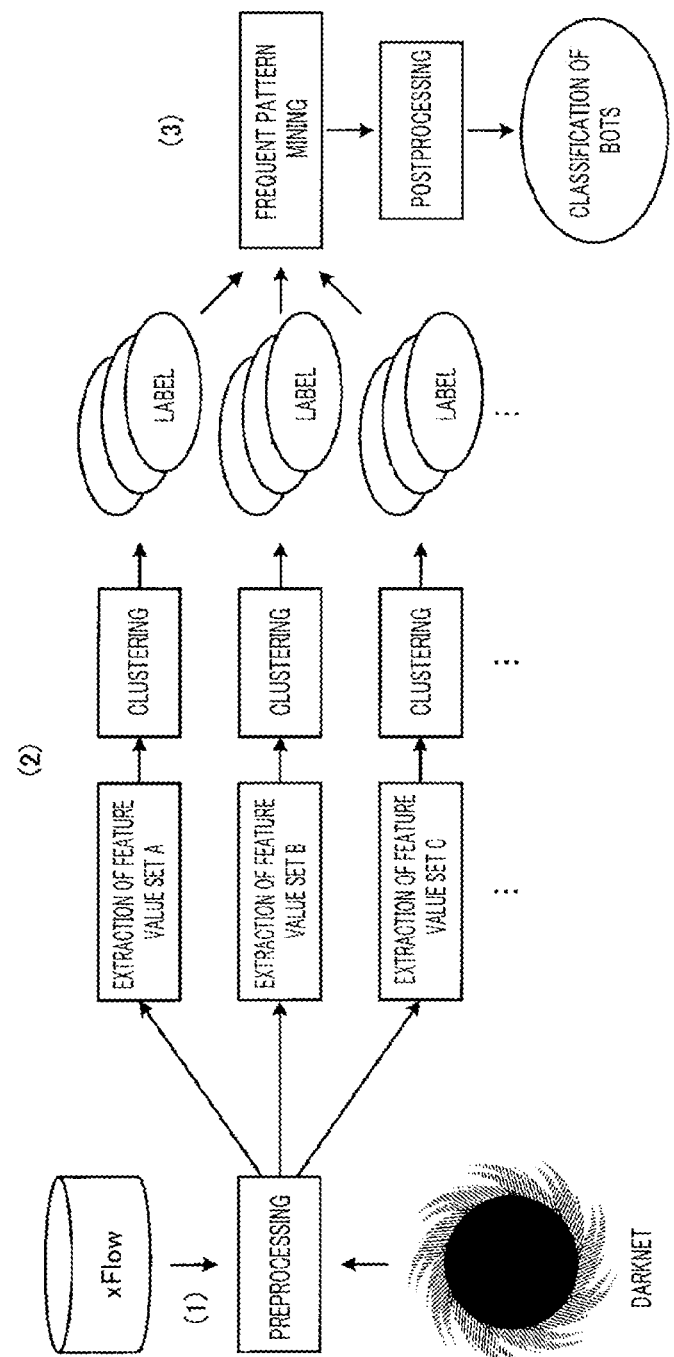
FIG. 4 is a view for explaining an outline of processes by the classification apparatus according to the first embodiment.

Herein, by using an example in FIG. 4, a description will be given of an outline of processes by the classification apparatus 10 according to the first embodiment. FIG. 4 is a view for explaining the outline of the processes by the classification apparatus according to the first embodiment. As shown by way of example in FIG. 4, the acquisition section 13a of the classification apparatus 10 acquires the communication log such as the xFlow and, as the preprocessing performed on the acquired communication log, selects the traffic data having the IP address which satisfies the predetermined condition as the target traffic data to be processed (see (1) in FIG. 4).

Figure 5:
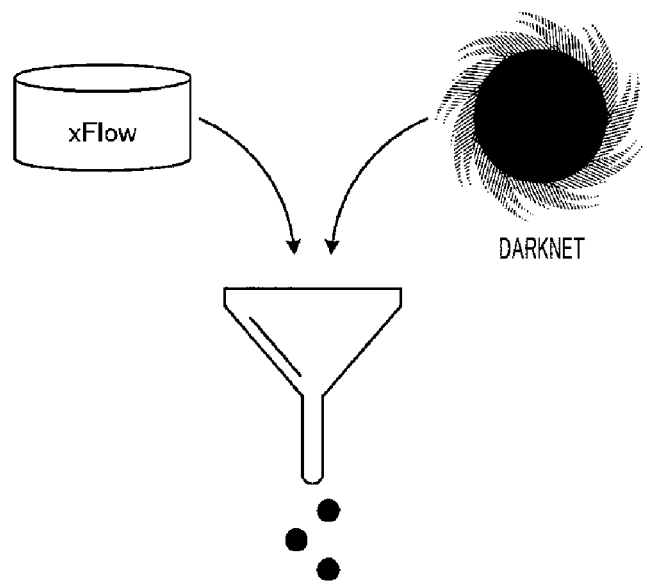
FIG. 5 is a view for explaining preprocessing performed on a communication log by the classification apparatus according to the first embodiment.

Herein, by using FIG. 5, a description will be given of an example of the preprocessing performed on the communication log. FIG. 5 is a view for explaining the preprocessing performed on the communication log by the classification apparatus according to the first embodiment. As shown byway of example in FIG. 5, for example, the acquisition section 13a uses only the flow (traffic data) having, as the source, the IP address from which the packet in which the control flag in the TCP header indicates "SYN" has been transmitted to the darknet and at which 20 or more flows in one-way communication have been observed during the predetermined time period, which are the predetermined conditions.

Returning to the description of FIG. 4, the extraction section 13b of the classification apparatus 10 extracts the feature values specified by the preset feature value sets A to C. Herein, the extraction section 13b may perform the processes for extracting the feature values specified by the feature value sets A to C in parallel, or may perform the processes for extracting the feature values specified by the feature value sets A to C sequentially. Subsequently, the classification section 13c performs clustering of the individual IP addresses based on the combination of the feature values extracted for each of the feature value sets A to C, and assigns the label to each IP address based on the clustering result (see (2) in FIG. 4).

Figure 6:
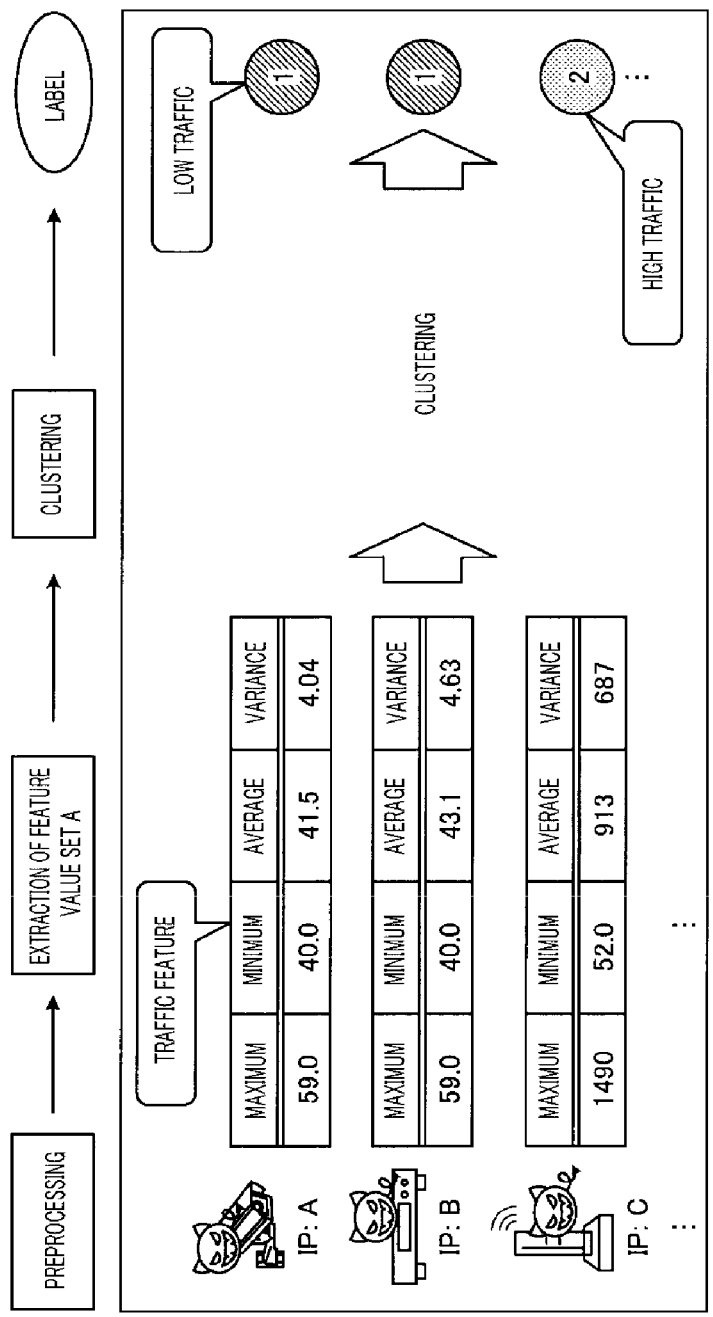
FIG. 6 is a view for explaining a feature value extraction process by the classification apparatus according to the first embodiment.
Figure 7:
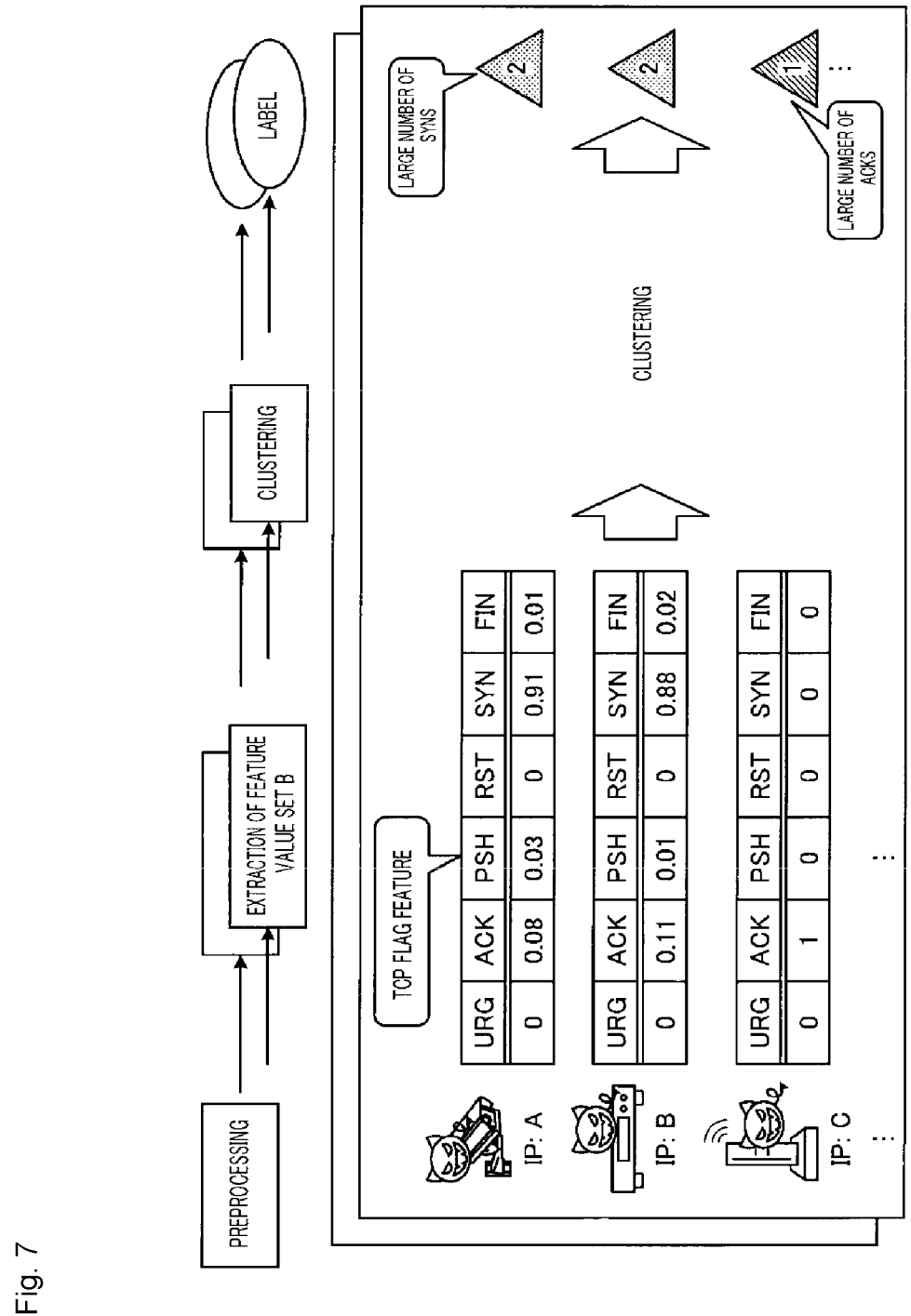
FIG. 7 is a view for explaining the feature value extraction process by the classification apparatus according to the first embodiment.
Figure 8:
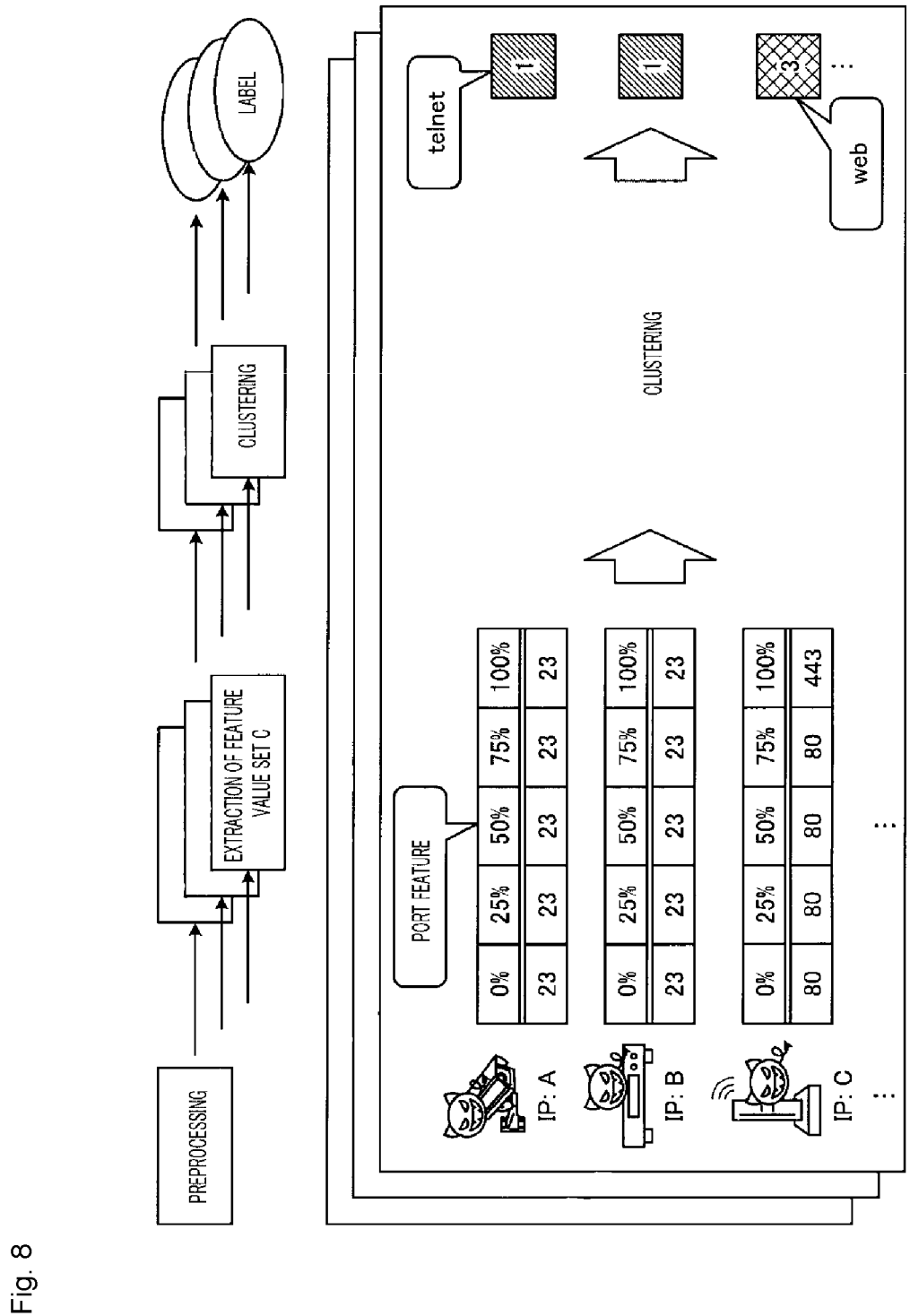
FIG. 8 is a view for explaining the feature value extraction process by the classification apparatus according to the first embodiment.

Herein, by using examples in FIGS. 6 to 8, a description will be given of a feature value extraction process by the classification apparatus 10. FIGS. 6 to 8 are views for explaining the feature value extraction process by the classification apparatus according to the first embodiment. First, by using FIG. 6, a description will be given of the process for extracting the feature values specified by the feature value set A. In the following description, suppose that the feature values related to traffic are set as the target feature values to be extracted in the feature value set A.

As shown by way of example in FIG. 6, the extraction section 13b extracts, for each source IP address, "maximum", "minimum", "average", and "variance" of the number of bytes per packet as the feature values related to the traffic. For example, as shown by way of example in FIG. 6, as the feature values of a source IP: A, the extraction section 13b extracts "59.0" bytes as "maximum" of the number of bytes per packet, extracts "40.0" bytes as "minimum" thereof, extracts "41.5" bytes as "average" thereof, and extracts "4.04" bytes as "variance" thereof.

Subsequently, the classification section 13c performs clustering of the individual source IP addresses, and assigns the label to each source IP address based on the clustering result. For example, the classification section 13c performs clustering of the source IP addresses to classify the source IP addresses into a cluster of the source IP addresses having low traffic and a cluster of the source IP addresses having high traffic, and assigns the label "2" to the source IP address having high traffic and assigns the label "1" to the source IP address having low traffic.

Next, by using FIG. 7, a description will be given of the process for extracting the feature values specified by the feature value set B. In the following description, suppose that the feature values related to the TCP flag are set as the target feature values to be extracted in the feature value set B.

As shown by way of example in FIG. 7, the extraction section 13b extracts, for each source IP address, ratios of "URG", "SYN", "PSH", "RST", "ACK", and "FIN" of the TCP flag in a transmission packet as the feature values related to the TCP flag. For example, as shown by way of example in FIG. 7, as the feature values of the source IP: A, the extraction section 13b extracts "0" as the ratio of "URG", extracts "0.08" as the ratio of "ACK", extracts "0.03" as the ratio of "PSH", extracts "0" as the ratio of "RST", extracts "0.91" as the ratio of "SYN", and extracts "0.01" as the ratio of "FIN".

Subsequently, the classification section 13c performs clustering of the individual source IP addresses, and assigns the label to each source IP address based on the clustering result. For example, the classification section 13c performs clustering of the source IP addresses to classify the source IP addresses into a cluster of the source IP addresses each having a large number of "ACKs" of the TCP flag and a cluster of the source IP addresses each having a large number of "SYNs" of the TCP flag, and assigns the label "1" to the source IP address having a large number of "ACKs" and assigns the label "2" to the source IP address having a large number of "SYNs".

Next, by using FIG. 8, a description will be given of the process for extracting the feature values specified by the feature value set C. In the following description, suppose that the feature values related to a port are set as the target feature values to be extracted in the feature value set C. As shown byway of example in FIG. 8, the extraction section 13b extracts, for each IP address on a client side, minimum (0%), 25%, mean (50%), 75%, and maximum (100%) source port numbers when the source port numbers used during the packet transmission are arranged in ascending order as the feature values related to the port.

For example, as shown by way of example in FIG. 8, as the feature values of the IP address on the client side: A, the extraction section 13b extracts "23" as the "0%" port number, extracts "23" as the "25%" port number, extracts "23" as the "50%" port number, extracts "23" as the "75%" port number, and extracts "23" as the "100%" port number. This means that a destination port number "23" has been always used during the packet transmission.

Subsequently, the classification section 13c performs clustering of the individual IP addresses on the client side, and assigns the label to each IP address on the client side. For example, the classification section 13c performs clustering of the individual IP addresses on the client side according to the tendency of a used port number.

Note that the description has been made by using the three feature value sets A to C as examples in the examples in FIGS. 6 to 8 described above, but the feature value set is not limited thereto. Herein, a description will be given of a specific example of the feature value set by using an example in FIG. 9. FIG. 9 is a view showing the specific example of the feature value set. As shown by way of example in FIG. 9, for example, 11 feature value sets are preset as the feature value sets, and the classification apparatus 10 may execute processes for all feature value sets or part of the feature value sets. In the example in FIG. 9, as set names of the feature value sets, "transmission flag", "reception flag", "transmission amount", "reception amount", "transmission amount 2", "reception amount 2", "source port", "client port", "destination port", "server port", and "OS" are set.

For example, in the set name "transmission flag", the feature values related to the TCP flag are set as the target feature values to be extracted, and ratios of "URG", "SYN", "PSH", "RST", "ACK", and "FIN" of the TCP flag in the transmission packet are extracted for each source IP address. In the set name "OS", the type of an OS of the source which has transmitted an SYN packet to the darknet is extracted.

As a compilation unit, any of "sa" indicative of compilation based on the source IP address, "da" indicative of compilation based on the destination IP address, "cli" indicative of compilation based on the IP address on the client side, and "srv" indicative of compilation based on the IP address on a server side is set. Note that the IP address having a higher port number is used as the IP address on the client side in the case of "cli", and the IP address having a lower port number is used as the IP address on the server side in the case of "srv". In addition, the number of dimensions of the feature value to be extracted is also set. For example, in the set name "transmission flag", "6" is set as the number of dimensions.

Returning to the description of FIG. 4, the counting section 13d of the classification apparatus 10 counts the number of times of appearance of the pattern having the same combination of the classification results by using the frequent pattern mining method, and performs classification of bots (see (3) in FIG. 4).

Figure 10:
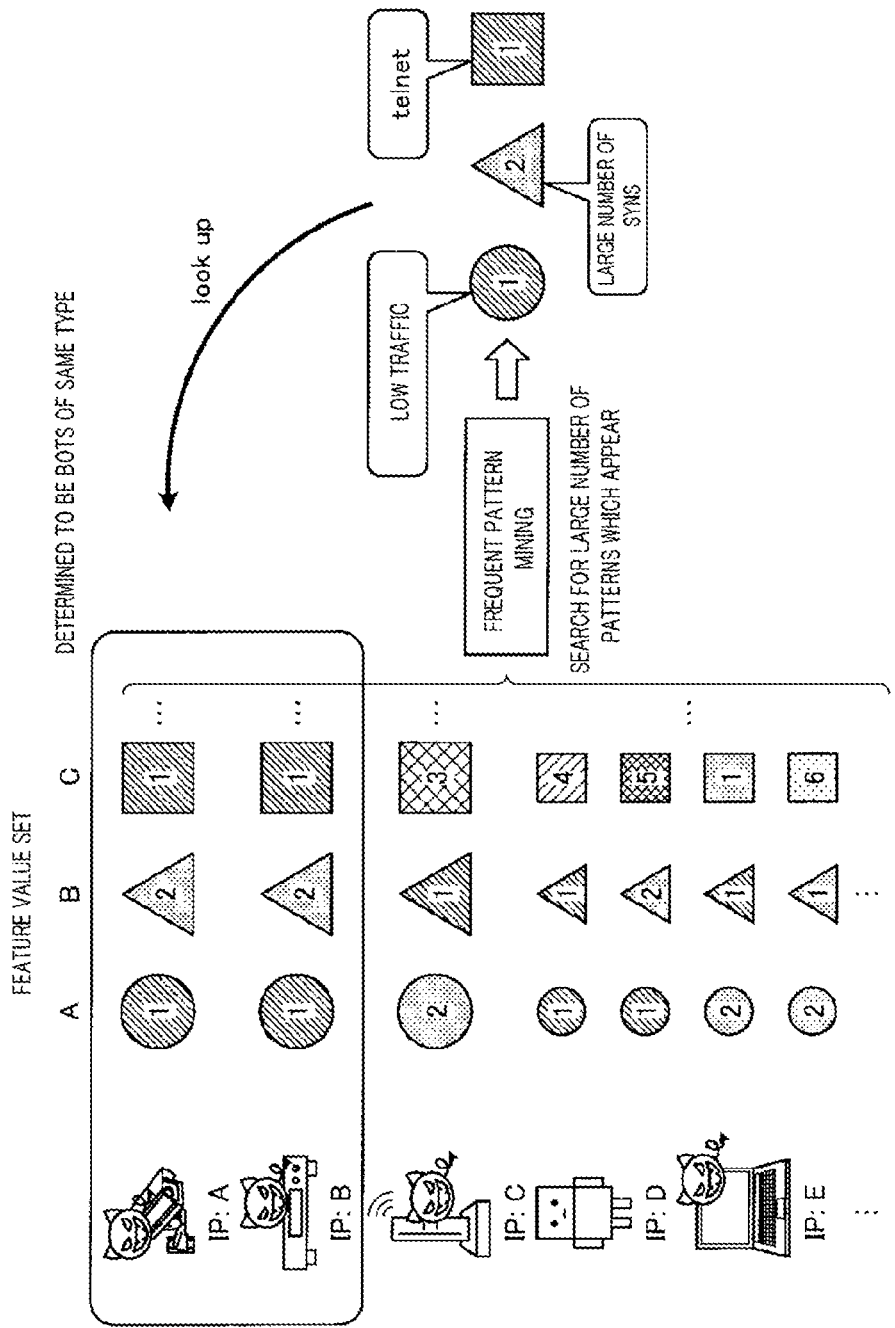
FIG. 10 is a view for explaining a process for classifying bots of the same type by using a frequent pattern mining method by the classification apparatus according to the first embodiment.

Herein, by using FIG. 10, a description will be given of a process for classifying bots of the same type by using the frequent pattern mining method. FIG. 10 is a view for explaining the process for classifying the bots of the same type by using the frequent pattern mining method by the classification apparatus according to the first embodiment. As shown by way of example in FIG. 10, the counting section 13d searches for a large number of patterns which appear by using the frequent pattern mining method. In the example in FIG. 10, a pattern having the label "1" of the feature value set A, the label "2" of the feature value set B, and the label "1" of the feature value set C is identified as a frequent pattern, and it is determined that IP addresses "A" and "B" corresponding to the frequent pattern are the IP addresses of bots of the same type.

As features of the bot, it is possible to easily grasp that traffic is low, a large number of SYN packets are transmitted, and a communication protocol is telnet. That is, in the classification apparatus 10, it is possible to divide the feature value with aspects having meanings, and interpret the meaning of the label of each aspect. In addition, in the classification apparatus 10, it is possible to extract the frequent combination of features to grasp the entire picture of each bot with a plurality of labels.

Herein, by using FIG. 11 and FIG. 12, a description will be given of examples of a bot having features. Each of FIGS. 11 and 12 is a view showing the example of the observed bot having features. As shown byway of example in FIG. 11, from the frequent pattern of each feature value set, it is possible to observe a bot which seems to be a mirai-based bot having such features that a large number of SYN packets are transmitted, the number of bytes of the transmission packet and the number of bytes of the reception packet are small, 23 and 2323 are used as the destination ports, and an OS is Linux (registered trademark) 2.4.x.

In addition, as shown by way of example in FIG. 12, judging from the frequent pattern of each feature value set, the source port and the client port have features and the destination port has no feature, and hence it is possible to observe a bot having such features that the bot serves as a scanner which uses a fixed source port number, and scans various ports.

That is, in the classification apparatus 10, by dividing the feature value from a plurality of viewpoints and performing the extraction, and using the frequent combination in the classification, interpretation of the meaning of each classification result and the meaning interpretation of the final classification result obtained by the combination of the classification results are facilitated. Consequently, in the classification apparatus 10, it is possible to determine, among unknown data, the type of specific data.

Figure 13:
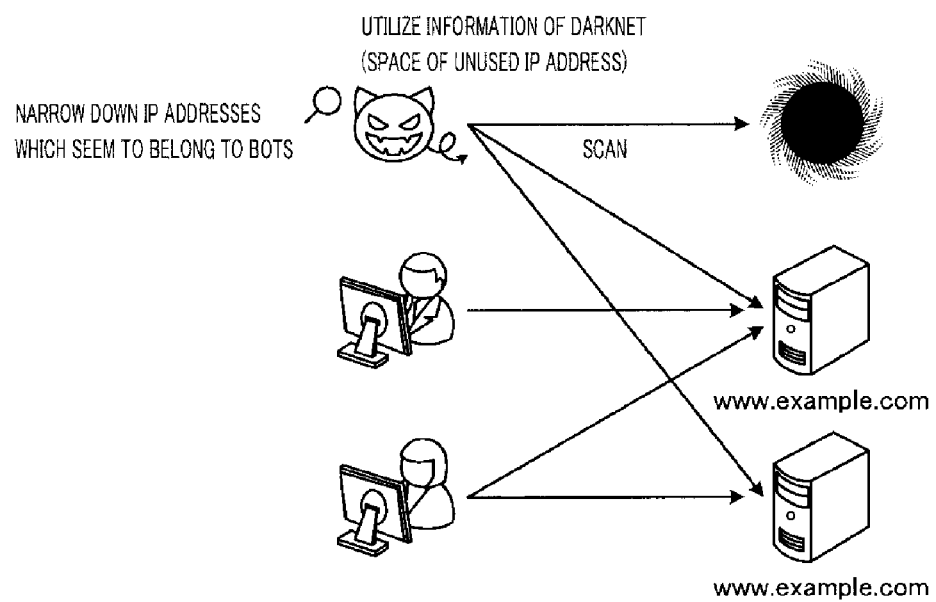
FIG. 13 is a view for explaining a process for narrowing down IP addresses which seem to belong to bots.

In addition, in the classification apparatus 10 according to the first embodiment, the IP addresses which seem to belong to bots are narrowed down by using the condition that the IP address corresponds to the IP address from which the packet in which the control flag in the TCP header indicates "SYN" has been transmitted to the darknet. Accordingly, as shown byway of example in FIG. 13, in the classification apparatus 10 according to the first embodiment, by utilizing information of the darknet which is space of an unused IP address and narrowing down the IP addresses which seem to belong to bots, it is possible to reduce the number of pieces of target traffic data to be processed to reduce a process load. FIG. 13 is a view for explaining a process for narrowing down the IP addresses which seem to belong to bots.

[Flow of Processes of Classification Apparatus]

Figure 14:
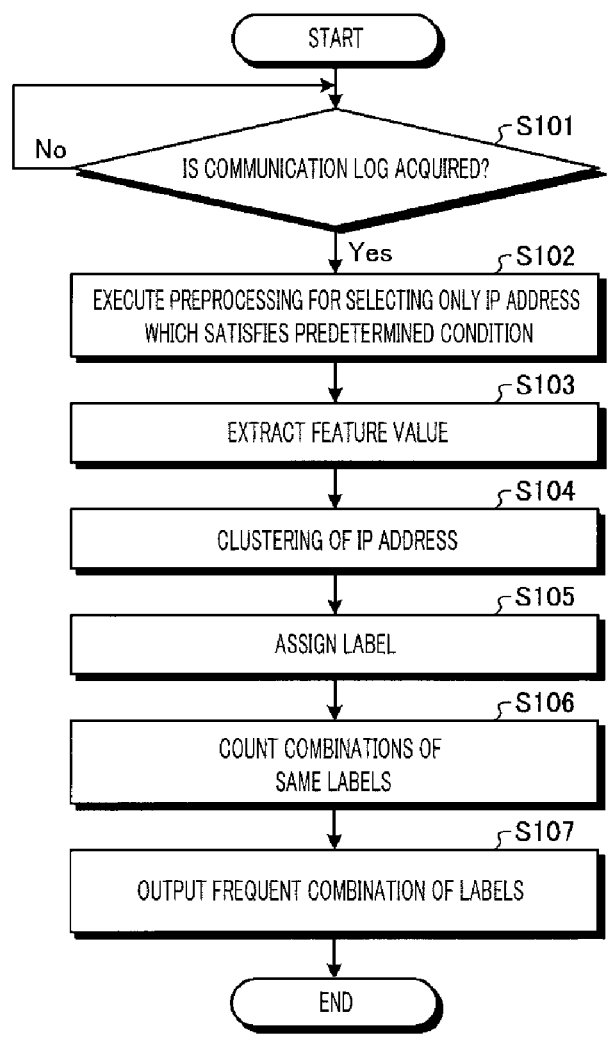
FIG. 14 is a flowchart for explaining processes by the classification apparatus according to the first embodiment.

Next, by using FIG. 14, a description will be given of the flow of processes of the classification apparatus 10 according to the first embodiment. FIG. 14 is a flowchart for explaining the processes by the classification apparatus according to the first embodiment.

As shown in FIG. 14, when the acquisition section 13a of the classification apparatus 10 acquires the communication log including a plurality of pieces of traffic data in the predetermined time period (affirmative in Step S101), as the preprocessing performed on the acquired communication log, the acquisition section 13a executes the preprocessing for selecting only the traffic data having the IP address which satisfies the predetermined condition as a target to be processed (Step S102).

Then, the extraction section 13b extracts different types of feature values from the plurality of pieces of traffic data acquired by the acquisition section 13a (Step S103). Specifically, the extraction section 13b extracts the feature values specified by each preset feature value set.

Subsequently, the classification section 13c performs clustering of the individual IP addresses based on the combination of the feature values extracted for each feature value set (Step S104), and assigns the label to each IP address based on the clustering result (Step S105).

Then, the counting section 13d uses a plurality of the classification results obtained by the classification by the classification section 13c to count the number of times of appearance of the combination of the same labels (Step S106), and outputs the frequent combination of the labels as data of the same group via the output section 12 (Step S107).

Effect of First Embodiment

Thus, the classification apparatus 10 according to the first embodiment acquires the communication log including the plurality of pieces of traffic data, and extracts different types of feature values from the plurality of pieces of traffic data. Subsequently, the classification apparatus 10 classifies the traffic data on a per IP address basis based on the extracted different types of feature values, and uses a plurality of the classification results to count the number of times of appearance of the pattern having the same combination of the classification results. Accordingly, the classification apparatus 10 can facilitate grasping of features of the data from the classification result.

Thus, in the classification apparatus 10 according to the first embodiment, the classification is performed by dividing the feature value into a few feature values. In the division, the extraction of the feature value is performed from different viewpoints such as, e.g., a statistic of a packet size and the ratio of the TCP flag in the case of network traffic data, and the classification is performed. By performing the classification in this manner, it is possible to obtain the classification result corresponding to the inputted feature value, and the interpretation of the meaning of the result is improved.

For example, in the classification apparatus 10, suppose that, when the classification is performed by using network traffic data as input information, the feature value is divided from the viewpoints of the TCP flag and the packet size, and the classification is performed. In that case, in the classification based on the TCP flag, the classification result such as a large number of SYNs or ACKs may be obtained and, in the classification based on the packet size, the result such as a large or small transmission amount may be obtained. Thus, by dividing the feature value according to the viewpoint and performing the classification by using a few feature values as the input information, the classification result is simplified and the interpretation of the reason for the result is facilitated.

In addition, in the classification apparatus 10, the classification results obtained by the feature value division are compiled, and data having the same combination of the classification results which has appeared the number of times equal to or greater than a threshold value 0 is outputted and is handled as data of the same group. Further, in the classification apparatus 10, different classification results are compiled and, in the case where a specific pattern has appeared in many pieces of data, it is not the case that the combination of the same classification results is obtained accidentally but it is possible to determine that the combination thereof is a feature common to the group. The classification result is the result which is easy to interpret, and it becomes possible to grasp overall features by combining the results.

For example, in the example of the classification based on the TCP flag, in the case where a combination of a small number of SYNs and a small transmission amount is extracted, the combination of these features allows such an interpretation that this is a bot which performs scanning. In addition, by increasing the number of times of the division to increase the number of viewpoints for feature value extraction, it is possible to grasp the features of the classification more specifically.

[System Configuration and the Like]

The constituent elements of each apparatus shown in the drawings are functionally conceptual, and do not need to be physically configured as shown in the drawings. That is, the specific modes of separation and integration of the individual apparatuses are not limited to those shown in the drawings, and all or part of the apparatuses can be functionally or physically separated or integrated according to various loads or use situations based on an arbitrary unit. In addition, all or an arbitrary part of process functions performed in the individual apparatuses can be implemented by a CPU and a program analyzed and executed in the CPU, or can also be implemented as hardware which uses wired logic.

Further, among the processes described in the present embodiment, all or part of the processes described as the processes which are performed automatically can be performed manually, or all or part of the processes described as the processes which are performed manually can be performed automatically by a known method. In addition, information including the process procedure, the control procedure, the specific names, various pieces of data, and parameters described or shown in the above specification or the drawings can be arbitrarily changed unless otherwise indicated.

[Program]

Figure 15:
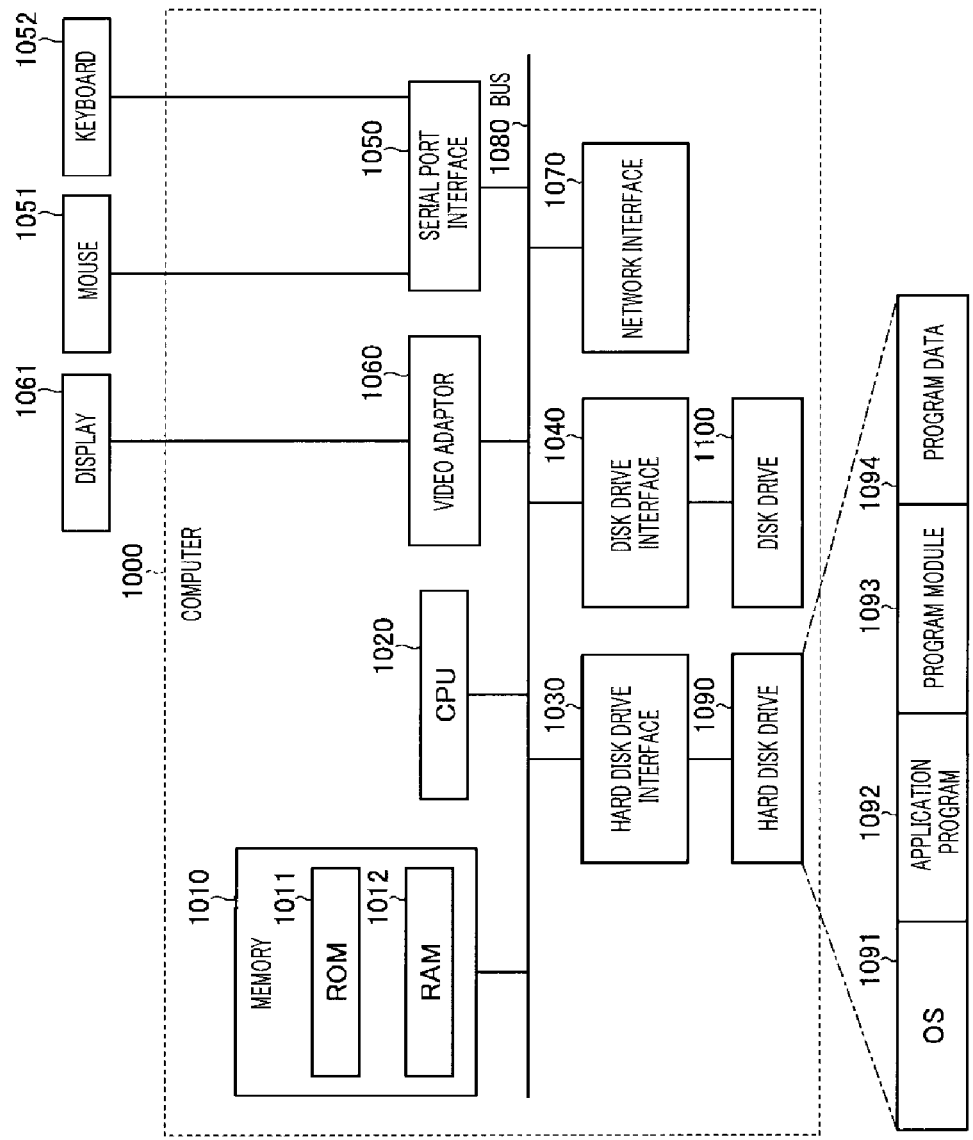
FIG. 15 is a view showing a computer which executes a classification program.

FIG. 15 is a view showing a computer which executes a classification program. A computer 1000 has, e.g., a memory 1010, and a CPU 1020. In addition, the computer 1000 has a hard disk drive interface 1030, a disk drive interface 1040, a serial port interface 1050, a video adaptor 1060, and a network interface 1070. These sections are connected to each other by a bus 1080.

The memory 1010 includes a ROM (Read Only Memory) 1011, and a RAM 1012. The ROM 1011 stores a boot program such as, e.g., a BIOS (Basic Input Output System). The hard disk drive interface 1030 is connected to a hard disk drive 1090. The disk drive interface 1040 is connected to a disk drive 1100. A detachable storage medium such as, e.g., a magnetic disk or an optical disk is inserted into the disk drive 1100. The serial port interface 1050 is connected to, e.g., a mouse 1051 and a keyboard 1052. The video adaptor 1060 is connected to, e.g., a display 1061.

The hard disk drive 1090 stores, e.g., an OS 1091, an application program 1092, a program module 1093, and program data 1094. That is, the program for specifying each process of the classification apparatus 10 is implemented as the program module 1093 in which a code which can be executed by the computer is described. The program module 1093 is stored in, e.g., the hard disk drive 1090. For example, the program module 1093 for executing the same process as that of the functional configuration in the apparatus is stored in the hard disk drive 1090. Note that the hard disk drive 1090 may be replaced by an SSD (Solid State Drive).

In addition, data used in the processes of the embodiment described above is stored as the program data 1094 in, e.g., the memory 1010 and the hard disk drive 1090. The CPU 1020 reads the program module 1093 and the program data 1094 stored in the memory 1010 and the hard disk drive 1090 into the RAM 1012 and executes the program module 1093 and the program data 1094 on an as needed basis.

Note that the program module 1093 and the program data 1094 are not limited to the case where the program module 1093 and the program data 1094 are stored in the hard disk drive 1090, and may be stored in, e.g., a detachable storage medium and may be read by the CPU 1020 via the disk drive 1100 or the like. Alternatively, the program module 1093 and the program data 1094 may also be stored in another computer connected via a network or a WAN. Further, the program module 1093 and the program data 1094 may also be read from another computer by the CPU 1020 via the network interface 1070.

REFERENCE SIGNS LIST

10 Classification apparatus
11 Input section
12 Output section
13 Control section
13*a* Acquisition section
13*b* Extraction section
13*c* Classification section
13*d* Counting section
14 Storage section
14*a* Communication log storage section
14*b* Classification result storage section

The invention claimed is:

1. A computer-implemented method for determining aspects of data, the method comprising:
   receiving, by a server, traffic data, wherein the traffic data originates from a device with a sender IP address, and the traffic data includes a plurality of packet data indicating the includes a sender IP address;
   determining feature values of respective predetermined features of respective packet data indicating the sender IP address, wherein the respective predetermined features include a data volume of the respective packet data indicating the sender IP address;
   determining, by performing clustering according to the feature values of the respective packet data indicating the sender IP address, labels of the predetermined features of the sender IP address, wherein the labels include an indication of the data volume being low;
   mining for a frequent pattern of labels of a plurality of predetermined features of the respective packet data originating from the sender IP address, wherein the frequent pattern of labels includes the indication of the data volume being lower than a predetermined data volume;
   determining, based on the frequent pattern of labels of the plurality of predetermined features of the respective packet data originating from the sender IP address, a type of data transmitted from the sender IP address, wherein the type of data represents a type of threat to a network, and the type of threat to the network includes a type of a bot; and
   displaying the type of data, the type of a bot, and a number of appearances of the type of data transmitted from the sender IP address.

2. The computer-implemented method of claim 1, the method further comprising:
   determining the type of data based on a pattern of three or more patterns of a combination of the labels, wherein the type of data is one of normal data, a mirai-based bot, or a scanner bot scanning a fixed source port number.

3. The computer-implemented method of claim 1, the method further comprising:
   retrieving a communication log, wherein the communication log includes the traffic data; and
   extracting the feature values for each of the predetermined features, wherein the predetermined features comprise one or more of:
   a number of bytes of transmitted data in the traffic data,
   a number of bytes of received data in the traffic data,
   a transmission flag of the traffic data,
   a reception flag of the traffic data,
   a port number of a destination of the traffic data, or
   a port number of a sender of the traffic data.

4. The computer-implemented method of claim 1, wherein the determining the labels further comprises using unsupervised machine learning.

5. The computer-implemented method of claim 1, wherein the frequent pattern mining includes identifying the frequent pattern of labels that occurs more frequently than another pattern of labels.

6. The computer-implemented method of claim 1, wherein the frequent pattern include a SYN value as a TCP flag, occurrences of at least twenty flows of occurrences as a number of one-way data packet communication, and the type of data indicates data transmission to a darknet, and the darknet represents a network space of an unused IP address.

7. The computer-implemented method according to claim 1, wherein the frequent pattern includes a combination of the data volume being low and a TCP flag including a SYN value, and the type of a bot indicates a mirai-based bot.

8. A system for determining aspects of data, the system comprises:
   a processor; and
   a memory storing computer-executable instructions that cause the system to:
   receive, by a server, traffic data, wherein the traffic data originates from a device with a sender IP address, and the traffic data includes a plurality of data indicating the sender IP address;
determining feature values of respective predetermined features of respective packet data indicating the sender IP address, wherein the respective predetermined features include a data volume of the respective packet data indicating the sender IP address;
determine, by performing clustering according to the feature values of the respective packet data indicating the sender IP address, labels of the predetermined features of the sender IP address, wherein the labels include an indication of the data volume being low;
mine for a frequent pattern of labels of a plurality of predetermined features of the respective packet data originating from the sender IP address, wherein the frequent pattern of labels includes the indication of the data volume being lower than a predetermined data volume;
determine, based on the frequent pattern of labels of the plurality of predetermined features of the respective packet data originating from the sender IP address, a type of data transmitted from the sender IP address, wherein the type of data represents a type of threat to a network, and the type of threat to the network includes a type of a bot; and
display the type of data, the type of a bot, and a number of appearances of the type of data transmitted from sender IP address.

9. The system of claim 8, the computer-executable instructions further causing the system to:
determine the type of data based on a pattern of three or more patterns of a combination of the labels, wherein the type of data is one of normal data, a mirai-based bot, or a scanner bot scanning a fixed source port number.

10. The system of claim 8, the computer-executable instructions further causing the system to:
retrieve a communication log, wherein the communication log includes a plurality of traffic data; and
extract the feature values for each of the predetermined features, wherein the predetermined features comprise one or more of:
a number of bytes of transmitted data in the traffic data,
a number of bytes of received data in the traffic data,
a transmission flag of the traffic data,
a reception flag of the traffic data,
a port number of a destination of the traffic data, or
a port number of a sender of the traffic data.

11. The system of claim 8, wherein the determining the labels further comprises using unsupervised machine learning.

12. The system of claim 8, wherein the generating the one or more scores uses a process of a frequent pattern mining includes identifying the frequent pattern of labels that occurs more frequently than another pattern of labels.

13. The system of claim 8, wherein the frequent pattern include a SYN value as a TCP flag, occurrences of at least twenty flows of occurrences as a number of one-way data packet communication, and the type of data indicates data transmission to a darknet, and the darknet represents a network space of an unused IP address.

14. The system of claim 8, wherein the frequent pattern includes a combination of the data volume being low and a TCP flag including a SYN value, and the type of a bot indicates a mirai-based bot.

15. A computer-readable non-transitory recording medium storing computer-executable instructions that cause a computer system to:
receive, by a server, traffic data, wherein the traffic data originates from a device with a sender IP address, and the traffic data includes a plurality of data indicating the sender IP address;
determine feature values of respective predetermined features of respective packet data indicating the sender IP address, wherein the respective predetermined features include a data volume of the respective packet data indicating the sender IP address;
determine, by performing clustering according to feature values of the respective packet data indicating the sender IP address, labels of the predetermined features of the sender IP address, wherein the labels include an indication of the data volume being low;
mine for a frequent pattern of labels of a plurality of predetermined features of the respective packet data originating from the sender IP address, wherein the frequent pattern of labels includes the indication of the data volume being lower than a predetermined data volume;
determine, based on the frequent pattern of the labels of the plurality of predetermined features of the respective packet data originating from the sender IP address, a type of data transmitted from the sender IP address, wherein the type of data represents a type of threat to a network, and the type of threat to the network includes a type of a bot; and
display the type of data, the type of a bot, and a number of appearances of the type of data transmitted from the sender IP address.

16. The computer-readable non-transitory recording medium of claim 15, the computer-executable instructions further causing the computer system to:
determine the type of data based on a pattern of three or more patterns of a combination of the labels, wherein the type of data is one of normal data, a mirai-based bot, or a scanner bot scanning a fixed source port number.

17. The computer-readable non-transitory recording medium of claim 15, the computer-executable instructions further causing the computer system to:
retrieve a communication log, wherein the communication log includes a plurality of traffic data; and
extract the feature values for each of the predetermined features, wherein the predetermined features comprise one or more of:
a number of bytes of transmitted data in the traffic data,
a number of bytes of received data in the traffic data,
a transmission flag of the traffic data,
a reception flag of the traffic data,
a port number of a destination of the traffic data, or
a port number of a sender of the traffic data.

18. The computer-readable non-transitory recording medium of claim 15, wherein the determining the labels further comprises using unsupervised machine learning.

19. The computer-readable non-transitory recording medium of claim 15, wherein the frequent pattern include a SYN value as a TCP flag, occurrences of at least twenty flows of occurrences as a number of one-way data packet communication, and the type of data indicates data transmission to a darknet, wherein the darknet represents a network space of an unused IP address.

20. The computer-readable non-transitory recording medium of claim 15, wherein the frequent pattern includes a combination of the data volume being low and a TCP flag including a SYN value, and the type of a bot indicates a mirai-based bot.

\* \* \* \* \*